United States Patent [19]

Abonia

[11] 4,262,277

[45] Apr. 14, 1981

[54] AUTOMATIC LIGHT WARNING DEVICE FOR AUTOMOBILES AND THE LIKE

[76] Inventor: Edgar S. Abonia, 46 Wagon Wheel La., Dix Hills, N.Y. 11746

[21] Appl. No.: 33,747

[22] Filed: Apr. 26, 1979

[51] Int. Cl.[3] .......................... B60Q 1/50; B60Q 5/00; B60R 25/10

[52] U.S. Cl. .......................... 340/52 D; 307/10 AT; 315/82; 340/63; 340/76

[58] Field of Search .................... 340/52 D, 52 F, 63, 340/76, 75, 81 F; 307/10 AT; 315/77, 82, 83

[56] References Cited

U.S. PATENT DOCUMENTS

| | | | |
|---|---|---|---|
| 2,787,778 | 4/1957 | Mulrooney | 340/75 |
| 3,209,326 | 9/1965 | Heiser | 340/63 |
| 3,493,926 | 2/1970 | Morena | 340/76 |
| 3,559,165 | 1/1971 | Kleeman | 340/76 X |
| 3,564,497 | 2/1971 | Gazzo | 340/75 |
| 3,771,122 | 11/1973 | Sattler | 340/81 F X |
| 3,794,967 | 2/1974 | Fischer | 340/63 |
| 3,882,452 | 5/1975 | Stevens | 340/52 F X |

*Primary Examiner*—Donald J. Yusko
*Assistant Examiner*—Joseph E. Nowicki
*Attorney, Agent, or Firm*—Richard L. Miller

[57] ABSTRACT

A warning system built into an automotive vehicle in order to attract outside attention and help; the system including a relay that turns on simultaneously all the lights and horns of the vehicle, the relay being in a circuit which includes a switching circuit that can be either manually turned on by a motorist, or which can automatically turn on if a thief sits on the seat, by the switching circuit being located, in part, under the seat cushion.

2 Claims, 2 Drawing Figures

AUTOMATIC LIGHT WARNING DEVICE FOR AUTOMOBILES AND THE LIKE

BACKGROUND OF THE INVENTION

This invention relates generally to automobile signalling systems. It is well known that if a motorist inside a conventional automobile, at this time, wishes to attract attention and help from outside persons, it can be difficult to do so. If he sounds the vehicle horn, it can possible be ignored, because the sound of a horn is very commonplace with today's heavy traffic. The same situation exists if he merely turns on the lights. Accordingly, he is obliged to do something more unusual, such as shouting out of an opened window. But this may not be an ideal solution, particularly if there is a danger outside which might thus reach him, such as an attack by a criminal or the like. Also if the motorist is in a situation in which he wishes to use his vehicle as an ambulance to get help for a stroke or heart attack victim, it is quite difficult. Thus, this situation is, accordingly, in need of an improvement.

SUMMARY OF THE INVENTION

Therefore, it is the principal object of the present invention to provide a warning device, built into an automotive vehicle, which in case of need for attention and help, turns on simultaneously the vehicle horns and also all the vehicle lights, including the headlights, backup lights, dome light, directional and cornering lights, as well as flasher lights, so that this unusual multitude of lights, together with the horn sound, is certain to attract outside attention.

Another object is to provide a warning device which can be manually activated if so wishes by a motorist, or which will automatically go on in case a thief attempts to steal the vehicle.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWING FIGURES

DETAILED DESCRIPTION OF PREFERRED EMBODIMENT

Figure 1:
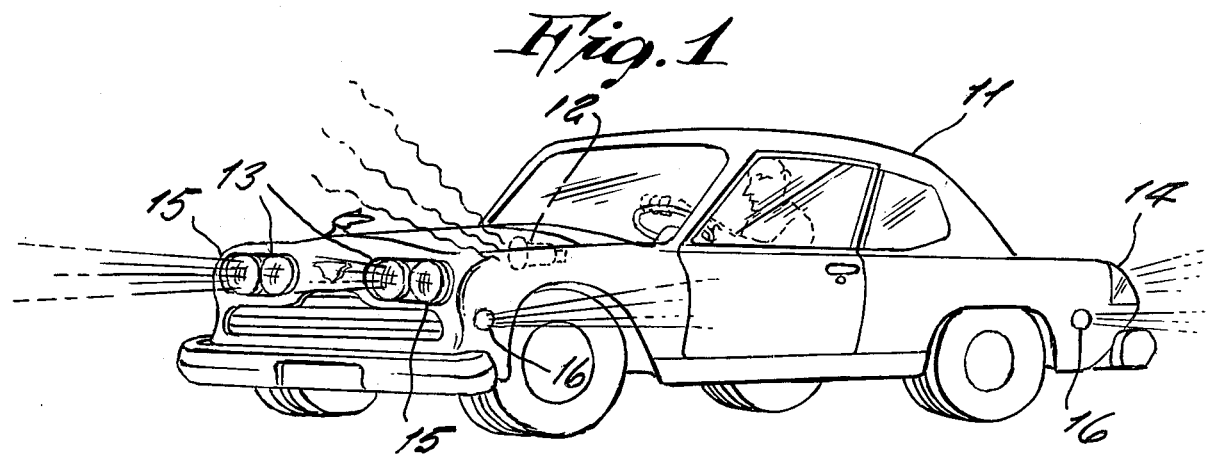
FIG. 1 is a perspective view of an automobile illustrating the invention.
Figure 2:
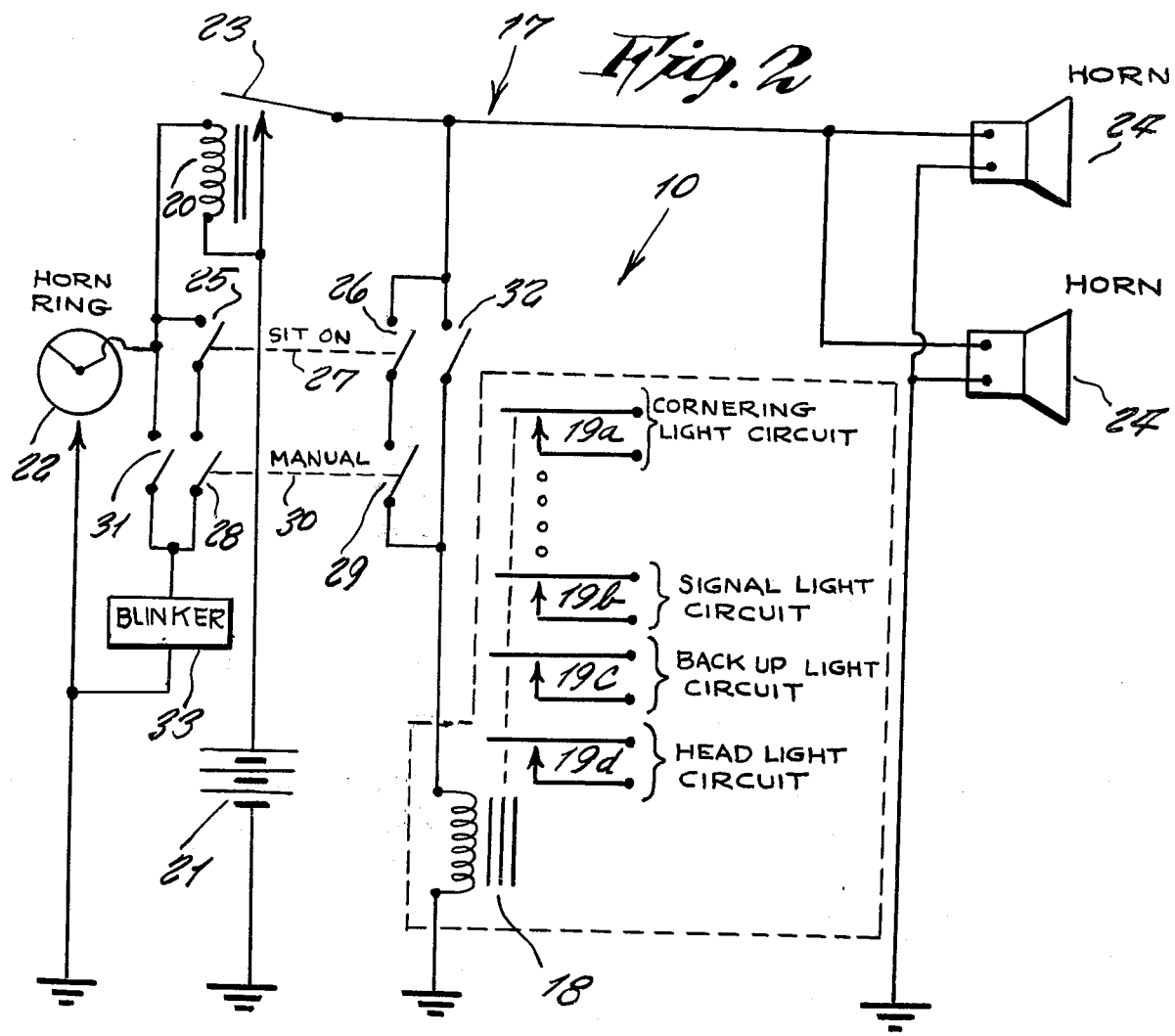
FIG. 2 is a schematic diagram of the electric circuit of the invention.

Referring now to the drawing in greater detail, the reference numeral 10 represents an automatic warning device, according to the present invention, and which is installed in an automotive vehicle 11, that is conventionally equipped with sounding horns 12 as well as headlights 13, backup lights 14, directional turn or cornering lights 15, side panel marker lights 16, and possibly also a fog light, dome flood light and flasher lights.

In the present invention, all of these lights and the horns can be simultaneously turned on either manually or automatically as preferred, by the electrical circuit 17.

This circuit includes a relay 18 having a plurality of individual contact pairs 19a through 19d, which are simultaneously all closed by the relay, each of the contact pairs being within the individual circuit of either one of the above-mentioned lights 13 through 16 and the like, so that the single relay can turn them on all together.

The circuit 17 also includes the conventional horn relay 20 connected to a positive side of the vehicle battery 21, and which is also connected to a horn ring switch 22, that when manually depressed, brings power to the relay 20 and thus closes a relay contact 23 thereof, so that power from the battery is brought to the automobile horns 24, for being sounded. Depressing of the horn ring switch 22 and resultant closing of relay 20 also may activate the relay 18 connected thereto, so that all the switches 19a through 19d are thus also closed, and all the light circuits are activated.

The circuit 17 has several modes in which the horn and light can be made to operate simultaneously, depending upon the will of the operator of the vehicle and the selection of various switches he might choose, depending upon his need and circumstances.

Switches 31 and 32 are manually operated by the vehicle's operator, preferably located on the dahsboard, and may be either closed or opened independantly as desired by the operator of the vehicle.

Switches 28 and 29 are mechanically ganged together by link 30 so that they are either both open or both closed at the same time. This switch pair 28 and 29 are either operated by a key inserted in a switch in the fender of the vehicle or else located at some hidden location on the vehicle, so as not to be operated readily by anyone other than the vehicle's owner.

Switches 25 and 26 are mechanically ganged together by link 27 and are so mounted and located in the vehicle under the driver's seat in such a manner that both switches are closed at the same time only when an operator sits upon the driver's seat.

When an operator of the vehicle desires not to use the automatic light warning device, the switches 28, 29, 31 and 32 are left open, and hence the automatic system is completely inoperative.

In operative use, the first mode in which the automatic system could be operative, is by closing switch 32 only. In this first mode, every time the horn ring is depressed, the vehicle's horn will sound and all the vehicle's lights will illuminate simultaneously. This mode is extremely useful when driving at dusk, at night or in noisy city traffic, or when the observer of the vehicle is hard of hearing.

A second useful mode in which the automatic system could be operated is by closing switch 31 in addition to closing switch 32. In this second mode, a blinker device 33 is placed across the horn ring contact 22 so that the system continues to simultaneously sound the horn and illuminates the lights on and off continuously.

This second mode is extremely useful when the vehicle is disabled on a highway, to warn traffic to keep away and avoid inadvertant collisions when the operator has left the vehicle to summon help. This second mode is also useful if the vehicle is to be used as an emergency vehicle such as an ambulance or as a fire chief's car, etc.

A third useful mode in which the automatic system could be operated, is by closing only switch pair 28 and 29 and only whenever the vehicle is left unattended. In this third mode, whenever an unauthorized person attempts to sit on the driver's seat, the automatic system would sound the horn and illuminate the lights to indicate undesireable tampering with the vehicle.

The third mode of operation is accomplished by means of switch pair 25 and 26 mounted in such a manner that they are closed whenever a person sits upon the driver's seat and thereby supplies current respectively through switch pair 28 and 29 to the required relays 20 and 18.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic light and sound warning device for automobiles and the like, the automobile including a battery which operates a horn by means of a horn signal and a plurality of light circuits including head lights, back up lights, signal lights, and the like, said warning device comprising in combination, a horn relay having one side connectable to the automobile battery and the other side connectable to the horn signal, a horn contact operated by said horn relay and connectable between the automobile battery and the horn, a light relay connected to said horn contact so as to be energized by the automobile battery upon closure of the horn contact, a respective light contact in each of the light circuits, each of said light contacts being operated by said light relay, a blinker unit and a switching circuit connected in series circuit with this series circuit connected in parallel across the horn signal, said switching circuit comprising two parallel paths, a manually operated horn switch connected in one of said parallel paths, a horn enabling switch in series with a horn trigger switch connected in the other of said parallel paths a manually operated light switch connected in series between said horn contact and said light relay, a light enabling switch in series combination with a light trigger switch, said series combination being in parallel across said manually operated light switch, means for ganging together said horn enabling switch and said light enabling switch, and means for ganging together said horn trigger switch and said light trigger switch.

2. The combination as in claim 1, wherein said ganged trigger switches are connected under the driver's seat for automatic operation by an individual who sits on the driver's seat.

* * * * *